United States Patent [19]

Kukimoto et al.

[11] Patent Number: 4,563,297

[45] Date of Patent: Jan. 7, 1986

[54] FLUORESCENT COMPOSITION

[75] Inventors: Hiroshi Kukimoto, Yokohama; Kiyoshi Morimoto; Hitoshi Toki, both of Mobara, all of Japan

[73] Assignee: Futaba Denshi Kogyo K.K., Mobara, Japan

[21] Appl. No.: 271,695

[22] Filed: Jun. 8, 1981

Related U.S. Application Data

[63] Continuation of Ser. No. 118,914, Feb. 6, 1980, abandoned.

[51] Int. Cl.$^4$ .............................................. C09K 11/477
[52] U.S. Cl. ....................... 252/301.4 R; 252/301.4 S; 252/301.6 S
[58] Field of Search ................... 252/301.4 R, 301.4 S, 252/301.6 S

[56] References Cited

U.S. PATENT DOCUMENTS

| 2,991,383 | 7/1961 | Hardy | 252/301.6 S |
| 3,497,458 | 2/1970 | Schuil | 252/301.4 R |
| 4,027,192 | 5/1977 | Hanak | 252/301.4 R |

FOREIGN PATENT DOCUMENTS

| 52-10878 | 1/1977 | Japan | 252/301.4 S |

OTHER PUBLICATIONS

Schneider "Journal of Research of the National Bureau of Standards-A," vol. 65A, No. 5, 10/61 pp. 429-434.

*Primary Examiner*—Jack Cooper
*Attorney, Agent, or Firm*—Oblon, Fisher, Spivak, McClelland & Maier

[57] ABSTRACT

A fluorescent composition containing indium oxide and rare earth elements which can emit green, blue or red light under low-velocity electron excitation.

8 Claims, 4 Drawing Figures

FLUORESCENT COMPOSITION

This is a continuation of application Ser. No. 118,914, filed Feb. 6, 1980, now abandoned.

BACKGROUND OF THE INVENTION

1. Field of the Invention

This invention relates to a fluorescent composition, and more particularly to a fluorescent composition which can emit green, blue or red light under low velocity electron excitation under acceleration potential below 100 V.

2. Description of the Prior Arts

A fluorescent display apparatus has been generally used in various electric or electronic display apparatus, because it can be driven with relatively low voltage, less power consumption, and exhibit bright and very clear displays. The fluorescent display apparatus performs the display of letters or patterns by impinging electrons emitted from filamentary cathodes when energized and heated upon anodes on which to deposit phosphor layers and to which to selectively apply anode voltage. The phosphor layers deposited on the anodes of the fluorescent display apparatus generally consist of a fluorescent composition which can give forth emission of high luminance by excitation of low velocity electrons, namely low acceleration voltage.

There is heretofore known a ZnO:Zn system fluorescent composition as a low velocity electron excited fluorescent composition which is used for the fluorescent display apparatus. The ZnO:Zn system fluorescent composition can be energized by luminance threshold voltage, that is, dead voltage of as low as 1 V to 2 V, and sufficient luminance for display can be obtained with anode voltage of 10 V to 20 V. Thus, it is extremely superior as the low velocity electron excited fluorescent composition. However, the ZnO:Zn system phosphor can only emit green light under electron excitation. Thus, the luminous color emitted from the fluorescent display apparatus using the ZnO:Zn system fluorescent composition is limited to green.

On the other hand, as the expansion of the applied field of the fluorescent display apparatus, there has been a great demand for diversification of the luminous color for display. For example, when effecting a warning signal, red is preferable for increasing the warning effect rather than green. Furthermore, when displaying several kinds of informations in one or plural fluorescent display apparatuses, each of the informations can be correctly and extremely easy to recognize if the luminous color in each of the informations to be displayed is displayed in different colors. In order to meet such demand, various attempts have been made to develop a fluorescent composition which emits luminous color other than green by excitation of low speed electrons. For example, it has been proposed such low speed electron excited fluorescent compositions that are prepared by mixing various electric conductive materials with a ZnS:Ag or ZnS:Cu fluorescent composition used in the conventional cathode-ray tube which can emit various luminous color under high velocity electron excitation, or a (Zn, Cd)S:Ag or a $Y_2O_2S$:Eu fluorescent composition. Furthermore, it has also been proposed such fluorescent composition that is prepared by mixing $SnO_2$ which is originally an electric conductive material with Eu.

The fluorescent composition which has been produced heretofore is energized at the luminance threshold voltage of above ten volts, and the anode voltage is required to be above several ten volts in order to obtain sufficient luminance. Thus, it is unsatisfactory as a fluorescent composition for use in low velocity electron excitation. Accordingly, in the conventional fluorescent display apparatus with which a phosphor layer made of the fluorescent composition which is excited by low velocity electrons is provided in association with the ZnO:Zn phosphor layer in order to effect luminous display of different colors at the respective regions in one display portion, the driving circuit is complicated because of the difference in the luminance threshold voltage and the operating voltage of both phosphor layers. In addition, both phosphor layers emit lights in different luminance, respectively. Furthermore, the operation life and the stability are not satisfactory.

The fluorescent composition for use in high velocity electron excitation is generally made of electric insulating material. Thus, if electric conductive materials are mixed with the fluorescent composition in large volume, the electric conductivity of the fluorescent composition is improved, and the luminance threshold voltage and the driving voltage can be decreased. However, the electric conductive materials are effective only for improving the electric conductivity of the fluorescent composition without making any contribution to the luminance. Therefore, when the electric conductive materials are mixed with the fluorescent material in a high ratio to obtain the fluorescent composition for use in low velocity electron excitation, the mixing ratio of the fluorescent material is decreased by the volume of the electric conductive material. As a result, the fluorescent composition thus obtained decreases in its luminance because of the shortage of the luminous elements, and it can not give forth emission of high luminance enough for display. Furthermore, the fluorescent composition is liable to give forth uneven emission, because non-luminous electric conductive materials are ununiformly mixed therewith. Therefore, it is unacceptable from a standpoint of the display quality.

It is known that when rare earth elements are converted into substituted atoms in a matrix of fluorescent composition, energy applied to the fluorescent composition is given to the substituted atoms due to transfer resulting from resonance, and the rare earth elements emit lights of their own by the transition of the atoms. Accordingly, if the conductive material, such as, for example, $SnO_2$ is used as the matrix of the fluorescent composition, the fluorescent composition thus obtained can be excited by low velocity electron, and the $SnO_2$:Eu fluorescent composition made of $SnO_2$ to which the rare earth element, such as, for example, Eu is added has been proposed as explained hereinabove. However, the $SnO_2$:Eu fluorescent composition is not satisfactory in that it exhibits saturated characteristic under low luminance, and can not give forth emission of sufficient luminance.

The fluorescent composition which can emit light under low velocity electron excitation must have electric conductivity and yet must not be electrically charged. $SnO_2$ and $TiO_2$ are known as the matrix of the fluorescent composition having such electric conductivity, and the $SnO_2$:Eu fluorescent composition explained hereinabove has been proposed as one of such fluorescent compositions. However, in the $SnO_2$:Eu fluorescent composition, the amount of Eu added as an activator is extremely small, because Sn is a tetrad while Eu as an activator is a triad. The luminance saturation in the $SnO_2$:Eu fluorescent composition explained hereinabove is considered to be the low concentration of the activator.

SUMMARY OF THE INVENTION

The present invention is intended to eliminate the above-mentioned disadvantages of the prior art and to provide a novel fluorescent composition.

Therefore, it is an object of the present invention to provide a novel fluorescent composition which can be excited at luminance threshold voltage of several volts equivalent to that of the ZnO:Zn fluorescent composition and is particularly suitable for use in low velocity electron excitation.

It is another object of the present invention to provide a novel fluorescent composition which includes an activator in a crystalline matrix in a state of high concentration thereby giving forth emission of high luminance under low velocity electron excitation without having luminance saturation caused by an increase in anode voltage.

It is further object of the present invention to provide a novel fluorescent composition which is stable and exhibits excellent characteristics in the illumination stability and the life.

It is still another object of the present invention to provide a novel fluorescent composition which is applicable in many fields, such as, for example, in a multi-color fluorescent display apparatus, color plasma display apparatus and the like.

According to the present invention, the foregoing and other objects are attained by providing a fluorescent composition which can emit colors other than that obtained by the conventional ZnO:Zn fluorescent composition including red under low velocity electron excitation of several volts or several ten volts, low velocity electron excitation in gas plasma, or ultraviolet ray excitation. The fluorescent composition according to the present invention comprises mixture of indium oxide ($In_2O_3$) made of a triad indium as a matrix of the fluorescent composition and rare earth element, such as, for example, Eu. $In_2O_3$ is advantageous as the matrix of the fluorescent composition, because it is stable and also rare earth element can be added thereto in a high concentration. The fluorescent composition according to the present invention can be used as it is or to be added to a $Y_2O_3$:Eu, a $Y_2O_2S$:Eu or a (Zn, Cd)S:Ag which is of high electric resistance and can not give forth red emission of high luminance sufficient for display under low velocity electron excitation.

BRIEF DESCRIPTION OF THE DRAWINGS

Various other objects, features and attendant advantages of the present invention will be more fully appreciated as the same becomes better understood from the following detailed description when considered in connection with the accompanying drawings; wherein.

DETAILED DESCRIPTION OF THE PREFERRED EMBODIMENTS

Figure 1:
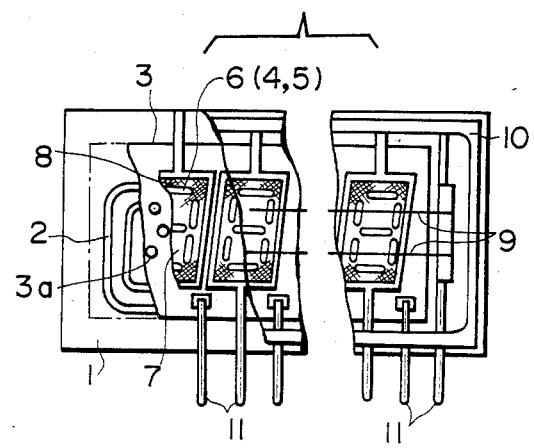
FIG. 1 is a partly cutaway plan view of a fluorescent display apparatus to which a fluorescent composition according to the present invention is applied.

Referring now to a preferred embodiment of the present invention, a fluorescent composition according to the present invention comprises $In_2O_3$ as a matrix of the fluorescent composition and a rare earth element added to $In_2O_3$ as an activator. When the rare earth element is Eu, $Eu_2O_3$ is used.

The fluorescent composition according to the present invention is produced by the following process. First, a predetermined amount of $In_2O_3$ and $Eu_2O_3$ which are the starting materials of the fluorescent composition according to the present invention is prepared. In this instance, the amount of $Eu_2O_3$ is of such volume that Eu is within the range of 0.001 to 10 mole % with respect to the matrix of $In_2O_3$. Then, $In_2O_3$ and $Eu_2O_3$ are added to a nitric acid solution and heated to be dissolved therein. The nitric acid solution dissolving $In_2O_3$ and $Eu_2O_3$ is subjected to evaporation to dryness to form nitrates of In and Eu, and then a predetermined amount of distilled water is added to obtain aqueous solution of the nitrates. Then, a saturated solution of oxalic acid is added to the aqueous solution of the nitrates to form co-precipitated oxalates of In and Eu, which are, in turn subjected to a washing treatment. After drying, they are filled in an alumina boat and fired.

The firing is conducted in an atmosphere of air, preferably in an oxidizing atmosphere at a temperature ranging from about 800° C. to about 1,500° C. for periods of about one hour to twelve hours. In this instance, the firing may be conducted by two stages so as to increase luminance of the fluorescent composition to be formed. For instance, the firing may be conducted at 1,000° C. for one hour in the first stage and at 1,300° C. for two to ten hours in the second stage. In addition, when firing, $B_2O_3$, $Li_2O$, $SiO_2$, $Li_2SiO_3$, $Li_2GeO_3$, $Na_2CO_3$ or the mixtures thereof may be added as a flux in order to promote the development of granular size of the particles of the fluorescent composition. It is to be understood that the process for forming the fluorescent composition according to the present invention is not limited to the precipitation technique explained hereinabove. It may be prepared by firing the mixture of $In_2O_3$ and $Eu_2O_3$ powders in an oxidizing atmosphere, or by adding $In_2O_3$ powders to aqueous solution of $Eu(NO_3)_3$ or $EuCl_3$ and firing the same in an oxidizing atmosphere after the removal of the moisture. In this manner, the $In_2O_3$:Eu fluorescent composition which is yellowish white in the powder state is prepared.

The $In_2O_3$:Eu fluorescent composition according to the present invention is used as it is or to be mixed with the conventional red emitting fluorescent composition which is of high electric resistance and can emit red light by electron rays accelerated at the voltage of several million volts to several ten thousand volts, such as, for example, $Y_2O_3$:Eu, $Y_2O_2S$:Eu, $YVO_4$:Eu or (Zn, Cd)S:Ag. This fluorescent composition is generally used in a color Braun tube.

Reference will now be made to a process for preparing the fluorescent composition which is made of the mixture of $In_2O_3$:Eu and $Y_2O_2S$:Eu fluorescent compositions as an example of the present invention.

First, the $Y_2O_2S$:Eu fluorescent composition is prepared by mixing $Y_2O_2$ with a predetermined amount of $Eu_2O_3$, adding the resulting mixture to S and an appropriate flux, for instance, $Na_2CO_3$, and firing the same in air at a temperature of ranging from about 1,000° C. to about 1,500° C. for periods of about one hour to about five hours. Then, the $In_2O_3$:Eu fluorescent composition is mechanically mixed with the $Y_2O_2S$:Eu red remitting fluorescent composition. The mixing process may be carried out by use of a conventional mixing instrument such as a mortar, a ball-mill, a mixer mill or the like. The $In_2O_3$:Eu fluorescent composition mixed with the $Y_2O_2S$:Eu fluorescent composition improves the electric conductivity of $Y_2O_2S$:Eu and converts $Y_2O_2S$:Eu into low velocity electron excitation fluorescent composition. In addition, $In_2O_3$:Eu emits red luminous color having substantially the same spectra as $Y_2O_2S$:Eu by the excitation of the low velocity electrons. Accordingly, there is no limit in the volume of $In_2O_3$:Eu fluorescent composition mixed with $Y_2O_2S$:Eu, and it can be mixed with $Y_2O_2S$:Eu in a mixing ratio of 10% to 90% so as to change resisting rate of the fluorescent composition depending upon its use.

Reference will now be made to characteristic of the fluorescent composition according to the present invention.

Figure 2:
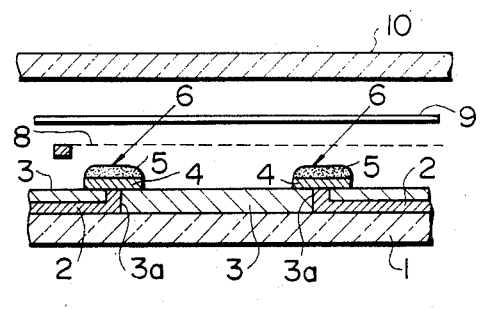
FIG. 2 is a fragmentary enlarged sectional view of the fluorescent display apparatus shown in FIG. 1.

The characteristic of the fluorescent composition is examined by using a fluorescent display apparatus which is schematically shown in FIGS. 1 and 2. The fluorescent display apparatus shown in FIGS. 1 and 2 comprises a substrate 1 made of an electric insulating material, such as, for example, glass or ceramic, wiring conductors 2 deposited on the substrate 1, and an electric insulating film layer 3 deposited on the wiring conductors 2 which includes through-holes 3a at the corresponding positions of the wiring conductors 2. The insulating film layer 3 is essentially made of a low melting frit glass with which a binder, organic solvent and a pigment such as a black pigment are mixed to form the paste which is printed and baked on the surface of the wiring conductors 2.

Reference numeral 4 designates anode conductors formed on the insulating film layer 3 in the shape of, for instance, the letter "8", and electrically connected to each of the corresponding wiring conductors 2 through the through-holes 3a. A phosphor layer 5 which is made of the $In_2O_3$:Eu or $In_2O_3$:Eu and $Y_2O_2S$:Eu fluorescent composition by the process explained hereinabove is deposited on the anode conductors 4 by the conventional screen printing, electrodeposition, precipitation method or the like, thereby forming anodes 6 as shown in FIG. 2. The anodes 6 are arranged in the shape of the letter "8" as shown in FIG. 1 thereby to form a pattern display portion 7. In this manner, an anode substrate is prepared.

The anode substrate is airtightly sealed by a flat-bottom boat shaped front cover 10 having a transparent viewing window at the peripheral portions of the substrate 1 to provide highly evacuated casing in which a meshshaped control electrode 8 disposed above the pattern display portion 7 in an opposed relationship therewith and a filamentary cathode 9 for emitting electrons when electrically heated are contained. Lead-in wires 11 air-tightly passing through the peripheral sealing portions between the substrate 1 and the upper cover 10 are electrically connected to the respective electrodes so that a drive signal may be supplied with each of the electrodes.

As is apparent, the fluorescent display apparatus shown in FIG. 1 is the conventional numeral display fluorescent tube wherein the phosphor layer 5 is formed of the $In_2O_3$:Eu or $In_2O_3$:Eu and $Y_2O_2S$:Eu fluorescent composition according to the present invention.

Figure 3:
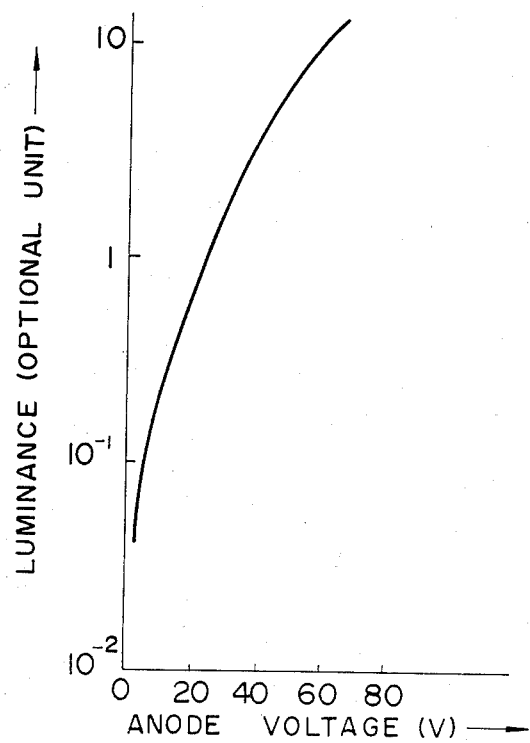
FIG. 3 is a diagram illustrating the relationship between luminance of emission and anode voltage according to a fluorescent composition of the present invention.

When driving the fluorescent display apparatus shown in FIG. 1 by applying heating voltage to the cathode 9, control voltage to the control electrode 8 and anode voltage to the anode 6, the anode 6 is begun to emit red color at the anode voltage of about 5 to 8 V as shown in FIG. 3, and the luminance of the red color emission is increased at the anode voltage of 20 V to 50 V and the sufficient luminance for display can be obtained.

As explained hereinabove, the $In_2O_3$:Eu fluorescent composition according to an embodiment of the present invention includes $In_2O_3$ therein as the matrix which is relatively good in electric conductivity. Thus, the luminance threshold voltage is as low as 5 to 6 V and the luminance satulation can not be recognized even if the anode voltage is increased as shown in FIG. 3. In addition, the matrix is made of the triad indium compounds, thus, the triad rare earth elements added as the activator can be easily converted into high density substituted atoms which result in the emission of the sufficient luminance under low velocity electron excitation.

Figure 4:
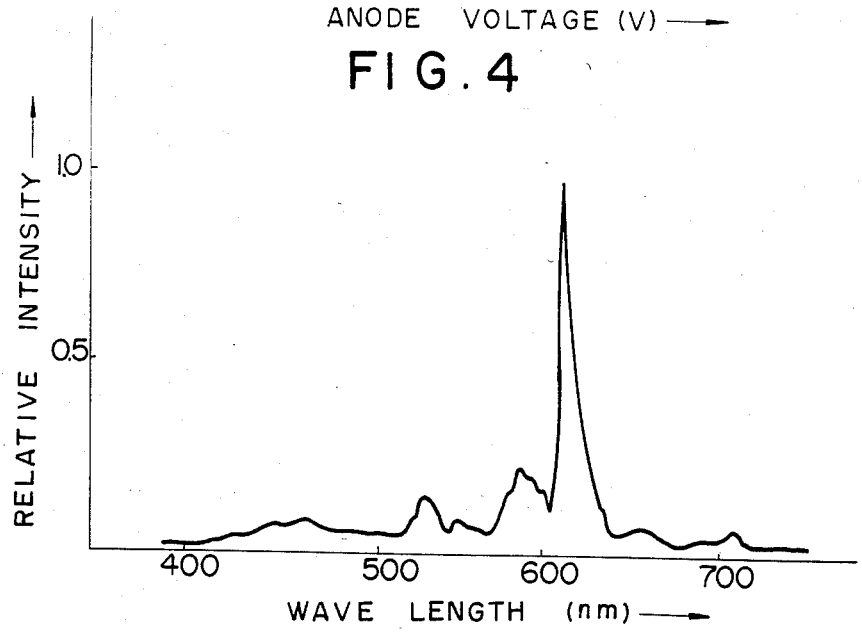
FIG. 4 is emission spectrum of a fluorescent composition according to the present invention.

The spectral emission characteristic of the $In_2O_3$:Eu fluorescent composition according to the present invention is relatively linear having the peak value of about 612 nm as shown in FIG. 4 which is indicative of excellent red color emission.

In the above embodiment, europium oxide [$Eu_2O_3$] is used as the activator, however, it may be europium sulfate [$Eu_2(SO_4)_3$] or europium nitrate [$Eu(No_3)_3$].

In the fluorescent composition made of the mixture of $In_2O_3$:Eu and $Y_2O_2S$:Eu according to the present invention, the electric conductivity of $Y_2O_2S$:Eu is improved by $In_2O_3$:Eu. Thus, there is not created such phenomena that the low velocity electrons impinged on the surface of the phosphor layer remain on the surface of the phosphor layer, to thereby negatively charge the surface of the phosphor layer and to prevent the impingement of the electrons on the surface of the phosphor layer. Accordingly, the sufficient luminance can be obtained by the excitation of low velocity electrons which are accelerated by the voltage of ten or several ten volts. Furthermore, $In_2O_3$:Eu for improving the electric conductivity of $Y_2O_2S$:Eu fluorescent composition. Accordingly, there is no decrease in the luminous elements due to the mixing and also there is no uneven illumination, but the fluorescent composition can give forth emission of high luminance sufficient for display under the low velocity electron excitation as shown in FIGS. 3 and 4. Moreover, each of the $In_2O_3$:Eu and $Y_2O_2S$:Eu fluorescent compositions can dope the activator of Eu with the matrix of $In_2O_3$ or $Y_2O_2S$ in high concentration. Accordingly, no saturated characteristic appears at the low luminance or at the increased anode voltage as shown in FIG. 3.

In the above embodiment, although the reference is only made to $Y_2O_2S$:Eu to be mixed with $In_2O_3$:Eu, it should be understood that the fluorescent composition which can give forth red emission under high velocity electron excitation, such as, for example, $Y_2O_3$:Eu, $YVO_4$:Eu, (Zn, Cd)S:Ag, or the like can be used.

It should be also to be understood that the activator used in the present invention is not limited to Eu described hereinabove, but it may be the rare earth elements, such as, for example, cerium (Ce), samarium (Sm), erbium (Er), terbium (Tb), ytterbium (Yb) and the like. When Ce or Sm is used as the activator, red emission can be obtained in the same manner as Eu is used, and green emission can be obtained by using Er or Tb as the activator.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A fluorescent composition, comprising:
a red light emitting phosphor of high electric resistance which emits said red light under high velocity electron excitation in combination with an oxide mixture consisting essentially of $Eu_2O_3$ in $In_2O_3$, wherein the amount of $Eu_2O_3$ in said mixture with $In_2O_3$ ranges from 0.001% to 10 mole % as the rare earth metal.

2. A fluorescent composition, comprising:
a red light emitting phosphor of high electric resistance which emits said red light under high velocity electron excitation in combination with an oxide mixture prepared by firing a rare earth metal oxide selected from the group consisting of cerium oxide, samarium oxide, erbium oxide, terbium oxide and ytterbium oxide in a matrix of $In_2O_3$ at a temperature of about 800° C. to about 1500° C. in an oxidizing atmosphere, said rare earth metal oxide being present in said mixture in an amount of 0.001% to 10 mole % as the rare earth metal.

3. The fluorescent composition of claim 1 or 2, wherein said red light emitting phosphor is $Y_2O_3$:Eu.

4. The fluorescent composition of claim 1 or 2, wherein said red light emitting phosphor is $Y_2O_2S$:Eu.

5. The fluorescent composition of claim 1 or 2, wherein said red light emitting phosphor is $YVO_4$:Eu.

6. The fluorescent composition of claim 1 or 2, wherein said red light emitting phosphor is (Zn, Cd)S:Ag.

7. The fluorescent composition of claim 1 or 2, wherein the mixing ratio of said red light emitting phosphor with said fluorescent composition ranges from 10% to 90%.

8. The fluorescent composition of claim 1 or 2, wherein said red light emitting phosphor emits light when accelerated at a voltage of several 10,000 volts to several million volts.

* * * * *